June 4, 1935.  T. V. BUCKWALTER  2,003,339
AXLE BEARING
Filed Feb. 7, 1934
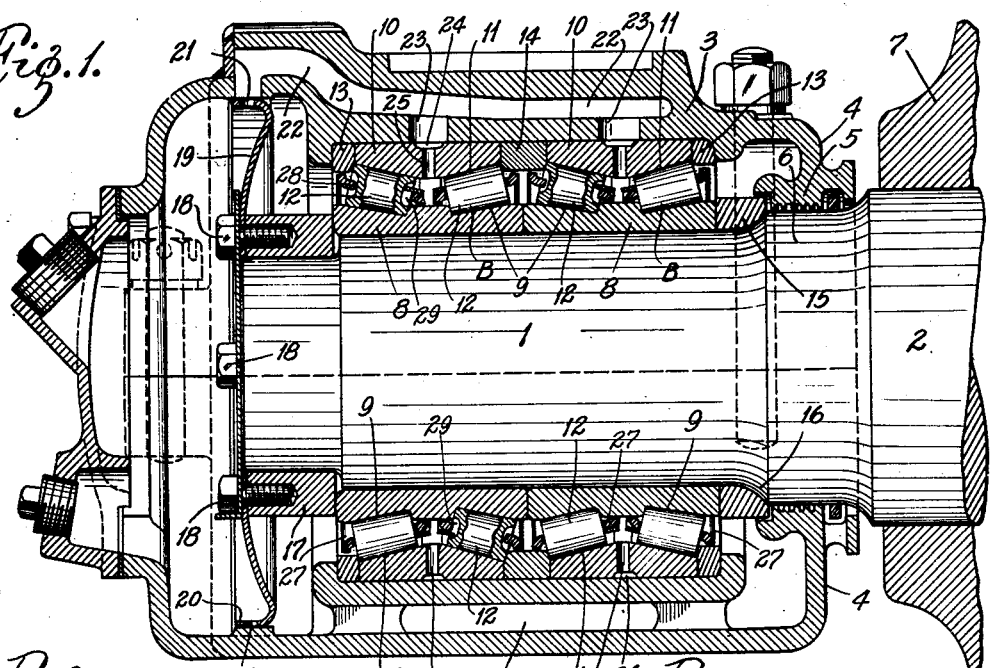
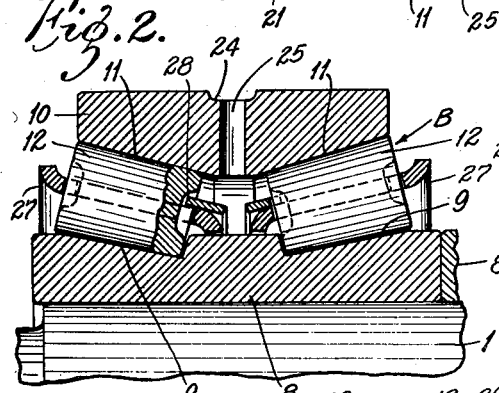
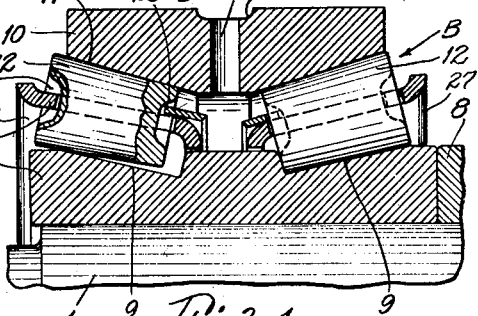
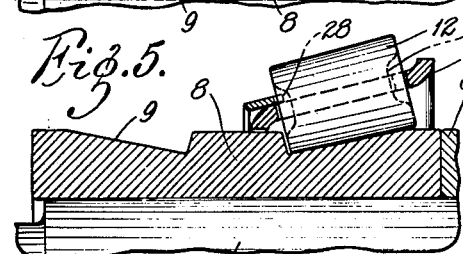
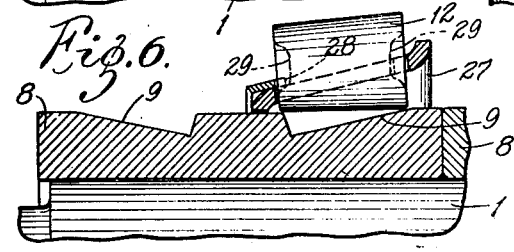
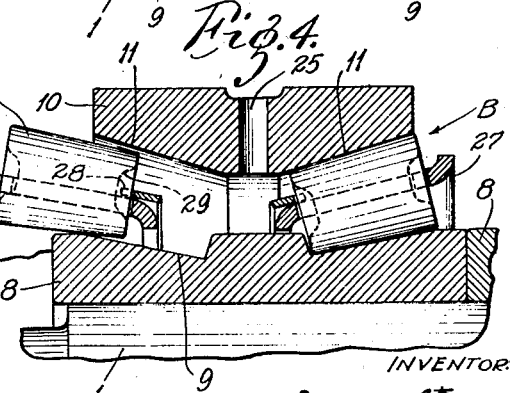
INVENTOR.
Tracy V. Buckwalter
by Carr, Hare & Gravely
HIS ATTORNEYS.

Patented June 4, 1935

2,003,339

UNITED STATES PATENT OFFICE 2,003,339

AXLE BEARING

Tracy V. Buckwalter, Canton, Ohio, assignor to The Timken Roller Bearing Company, Canton, Ohio, a corporation of Ohio Application February 7, 1934, Serial No. 710,051

6 Claims. (Cl. 308—180)

My invention relates to bearings for railway car and other axles and has as its principal object a construction whose inner bearing member can be mounted on an axle so as to permit removal of a wheel over said inner bearing member without disturbing it. The invention consists in the axle bearing and in the parts and combinations and arrangements of parts hereinafter described and claimed.

In the accompanying drawing,

Fig. 1 is a vertical sectional view through a railway car axle bearing and journal box provided with a bearing construction embodying my invention; and Figs. 2, 3, 4, 5, and 6 are partial sectional views of the bearing showing how the bearing cups and the rollers with their cages can be dismantled, permitting the car wheel to be removed over the bearing cones.

The reduced end or journal portion 1 of a railway car axle 2 extends into a horizontally split journal box 3 of any desired construction. Mounted on said journal portion 1 of said axle are two double row taper roller bearings B whose construction is more fully set forth in my application Serial No. 615,149. The innermost end of the journal box 3 is provided with inwardly extending ring members 4 that have an extended grooved closure portion 5 encircling a step part 6 of the axle between the journal portion 1 thereof and the main body 2. The car wheel 7 is mounted on the body 2 of the axle.

Each bearing comprises a cone 8 or inner bearing member having conical raceways 9 tapering toward the middle thereof, a cup 10 or outer bearing member having conical raceway portions 11 and a series of conical rollers 12 for each of said raceways. At the extreme ends of the assembled bearing cups 10 are thrust ribs 13 for the endmost rollers 12 and between the two bearing cups is a thrust rib 14 that has thrust portions for the two intermediate series of rollers. The innermost bearing cone 8 abuts against a ring 15 that is seated against a shoulder 16 on the axle and the outermost bearing cone is held by a suitable positioning collar 17. Secured to the end of the axle as by screws 18 is a disk 19 that has a circumferential rim flange 20 that dips into a pool of oil in the bottom of the housing. Said rim flange 20 has perforations 21 therein and carries oil to the top of the journal box where it goes through a longitudinal passageway 22, thence to short vertical passageways 23 that open into peripheral grooves 24 in the bearing cups, which, in turn, open into passageways 25 through the middles of said cups. At the bottom of the journal box is a return passageway 26 to permit oil to pass to the reservoir.

By separating the two parts of the journal box the bearings B are exposed. After the oil distributing disc 18 has been removed, the bearing cups 9 and roller and cage assemblies may be removed from the bearing cones, as shown in Figs. 2 to 6 and as described in said copending application. The cage 27 has pintles 28 in its ends that extend into wide recesses 29 in the ends of the rollers, so that the rollers, while held in the cage, are permitted radial tilting movement sufficient to enable them to bar the ribs and the large ends of the cones. Thus the outermost series of rollers 12 and the outermost thrust ring 13 may be withdrawn; then the outermost bearing cup 10 and the next series of rollers; after which the ribs, cup and rollers of the next bearing may be removed. The diameters of the journal portion 1 of the axle, the body portion 2 of the axle and the bearing cones 8 are so selected that the largest diameter of said bearing cones is less than the diameter of the wheel bore and of the body portion of the axle. Thus, when said bearing cups and roller assemblies have been removed, the wheel 7 can be stripped from the axle 2 without disturbing the bearing cones. The views 6 to 2 in reverse order indicate the process of assembling or reassembling the bearings.

As said bearing cones must be press-fitted on the axle and must be very accurately positioned, there is obviously danger of damaging said cones if they are removed from the axle, with the result that they could not be used again after being removed and the axle itself might be unfitted for the mounting of other bearing cones thereon. Even if the axle and cones were not damaged, the press-fit would be destroyed. Obviously, therefore, the above described construction has important advantages. Numerous changes might be made in the journal box construction and in the arrangement and positioning of the bearings; and I do not wish to be limited to the precise construction shown.

What I claim is:

1. An axle bearing comprising an axle having a reduced journal portion, bearing cones on said journal portion whose largest diameter is less than the diameter of the body of said axle, bearing rollers and bearing cups cooperating with said bearing cones, cages for said rollers permitting removal thereof without removing said cones from said axle a split journal box extending over the journal portion of said axle and receiving said bearing cups and a wheel on the body of said axle.

2. An axle bearing comprising an axle having a reduced journal portion, two double bearing cones on said journal portion whose largest diameter is less than the diameter of the body of said axle, conical bearing rollers, cages for said rollers permitting removal of each series of rollers without removing either of said bearing cones end thrust ribs and bearing cups cooperating with said bearing rollers, a split journal box extending over the journal portion of said axle and receiving said bearing cups and a wheel on the body of said axle, whereby, after said cups, rollers and cages have been removed, said wheel may be removed without interfering with said bearing cones.

3. An axle bearing comprising an axle having a reduced journal portion, a split journal box extending over said journal portion of said axle, a plurality of annular series of conical bearing rollers, a cage for each series of rollers permitting limited radial movement of said rollers for assembling and disassembling over the large end of a cone, bearing cones for said rollers on said journal portion whose greatest diameter is less than that of said axle, bearing cups in said journal box, and a wheel on said axle inwardly of said journal box.

4. An axle bearing comprising an axle having a reduced journal portion, bearing cones on said journal portion whose largest diameter is less than the diameter of the body of said axle, conical bearing rollers, end thrust ribs and bearing cups cooperating with said bearing cones, a cage for each series of rollers forming therewith a self-contained unit, the rollers having sufficient movement in said cages to permit assembly of said cages and rollers over the large ends of said bearing cones, a split journal box extending over the journal portion of said axle and receiving said bearing cups and a wheel on the body of said axle.

5. An axle bearing comprising an axle having a reduced journal portion, a split journal box extending over said journal portion of said axle, a plurality of annular series of conical bearing rollers having enlarged axial depressions in their ends, a cage for each series of rollers having pintles fitting loosely enough in said depressions to permit the assembled rollers to assume a position wherein elements of their conical surfaces are parallel to the axis of the bearing, thus permitting assembling and disassembling over the large end of a cone, bearing cones for said rollers on said journal portion whose greatest diameter is less than that of said axle, bearing cups in said journal box, and a wheel on said axle inwardly of said journal box.

6. An axle bearing comprising an axle having a reduced journal portion, double bearing cones on said journal portion having an outside diameter less than that of the body of said axle, each of said cones having conical raceway portions tapering towards the middle of said cone, an integral bearing cup for each of said bearing cones having corresponding conical raceway portions, a self-contained cage and roller assembly for each pair of raceways, said rollers having sufficient movement in said cages to permit assembly and disassembly of the rollers and cages over said bearing cones on said axle and a wheel on the body of said axle, whereby after removing said cups, rollers and cages, said wheel may be removed without disturbing said cones.

TRACY V. BUCKWALTER.